(12) United States Patent
Wang et al.

(10) Patent No.: US 9,822,014 B2
(45) Date of Patent: Nov. 21, 2017

(54) METHOD FOR MAKING LITHIUM IRON PHOSPHATE

(71) Applicants: Tsinghua University, Beijing (CN); HON HAI PRECISION INDUSTRY CO., LTD., New Taipei (TW)

(72) Inventors: Li Wang, Beijing (CN); Xiang-Ming He, Beijing (CN); Ji-Xian Wang, Beijing (CN); Jian Gao, Beijing (CN); Jian-Jun Li, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 249 days.

(21) Appl. No.: 14/081,171

(22) Filed: Nov. 15, 2013

(65) Prior Publication Data

US 2015/0086461 A1    Mar. 26, 2015

(30) Foreign Application Priority Data

Sep. 26, 2013    (CN) .......................... 2013 1 0444310 8

(51) Int. Cl.
*C01D 15/00* (2006.01)
*C01G 49/00* (2006.01)
(Continued)

(52) U.S. Cl.
CPC .............. *C01D 15/00* (2013.01); *C01B 25/45* (2013.01); *C01G 49/009* (2013.01);
(Continued)

(58) Field of Classification Search
CPC ...... C01D 15/00; C01G 49/00; C01G 49/009; C01B 25/265; C01B 25/30; C01B 25/375;
(Continued)

(56) References Cited

U.S. PATENT DOCUMENTS 7,959,885 B2 *  6/2011  Li ........................... B82Y 30/00
                                                                423/21.1
2010/0133467 A1 *  6/2010  Ikegawa .................... 252/182.1
(Continued)

FOREIGN PATENT DOCUMENTS

CN       101800311        8/2010
CN       101891181        11/2010
(Continued)

OTHER PUBLICATIONS

Long, Fei, et al. "Solvothermal synthesis, nanocrystal print and photoelectrochemical properties of CuInS 2 thin film." Materials Letters 64.2 (2010): 195-198.*
(Continued)

*Primary Examiner* — Richard M Rump
(74) *Attorney, Agent, or Firm* — Steven Reiss

(57) ABSTRACT

A method for making lithium iron phosphate is provided. A lithium chemical compound, a ferrous chemical compound, and a phosphate-radical chemical compound are mixed in an organic solvent to form a mixture. The mixture is solvothermal reacted in a solvothermal reactor at a predetermined temperature. A protective gas is introduced into the solvothermal reactor during the solvothermal reaction to increase a pressure in the solvothermal reactor to a level higher than a self-generated pressure of the solvothermal reaction.

17 Claims, 5 Drawing Sheets

(51) Int. Cl.
*H01M 4/58* (2010.01)
*C01B 25/45* (2006.01)
*H01M 4/36* (2006.01)
*H01M 4/62* (2006.01)

(52) U.S. Cl.
CPC .......... *H01M 4/5825* (2013.01); *H01M 4/366* (2013.01); *H01M 4/625* (2013.01)

(58) Field of Classification Search
CPC ..... C01B 25/39; C01B 25/425; C01B 25/445; H01M 4/00–4/98
See application file for complete search history.

(56) References Cited

U.S. PATENT DOCUMENTS

| | | |
|---|---|---|
| 2011/0052473 A1 | 3/2011 | Sano et al. |
| 2012/0003540 A1* | 1/2012 | Nakano et al. ............... 429/221 |
| 2013/0136989 A1* | 5/2013 | Wang ...................... C01B 25/45 |
| | | 429/221 |
| 2013/0236385 A1* | 9/2013 | Shirakawa et al. ........... 423/306 |

FOREIGN PATENT DOCUMENTS

| | | |
|---|---|---|
| CN | 101906661 | 12/2010 |
| CN | 101997117 | 3/2011 |
| CN | 102249208 | 11/2011 |
| CN | 103030128 | 4/2013 |
| WO | WO 2012029329 A1 * | 3/2012 |

OTHER PUBLICATIONS

Wang, G. X., et al. "Electrochemical properties of carbon coated LiFePO4 cathode materials." Journal of Power Sources 146.1 (2005): 521-524.*

* cited by examiner

METHOD FOR MAKING LITHIUM IRON PHOSPHATE

CROSS-REFERENCE TO RELATED APPLICATIONS

This application claims all benefits accruing under 35 U.S.C. §119 from China Patent Application No. 201310444310.8, filed on Sep. 26, 2013, in the China Intellectual Property Office, the contents of which are hereby incorporated by reference.

BACKGROUND

1. Technical Field

The present disclosure relates to methods for making cathode active materials of lithium ion batteries, and particularly to a method for making lithium iron phosphates.

2. Description of Related Art

Lithium iron phosphate ($LiFePO_4$) is an attractive cathode active material used in lithium ion batteries. Lithium iron phosphate has the advantages of high safety, low cost, and environmental friendliness. However, lithium iron phosphate has low electronic conductivity and a slow diffusion of lithium ions, which reduce a discharge capacity of the lithium ion battery after a number of cycles. Efforts on improving the cycling performance of the lithium ion battery using the lithium iron phosphate commonly relates to improve the electronic conductivity of the lithium iron phosphate, which have been made by carbon coating the lithium iron phosphate particle surface, and doping the lithium iron phosphate with metal ions.

Solid phase method, coprecipitation method, hydrothermal method, and solvothermal method are commonly used methods for preparing lithium iron phosphate. However, the solid phase method needs a high temperature to form the product, which has a high impurity and an uncontrolled morphology. In the coprecipitation method, a precursor of the lithium iron phosphate is coprecipitated. The precursor has a low purity and low crystallization degree, thus needs further heating at a high temperature. Hydrothermal method and solvothermal method use sealed autoclave as a reactor, water or organic solvent as a reacting medium. By heating the sealed autoclave, an environment of a high temperature and high pressure is created therein, to dissolve and re-crystal an insoluble material. The hydrothermal method and solvothermal method can synthesis a product with high crystallization degree at a relatively low temperature, in short time and low energy consumption.

However, the discharge capacities of the lithium iron phosphates formed by the above described methods are still relatively low.

Therefore, what is needed is to provide a method for making lithium iron phosphate having a relatively high discharge capacity.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

Figure 1:
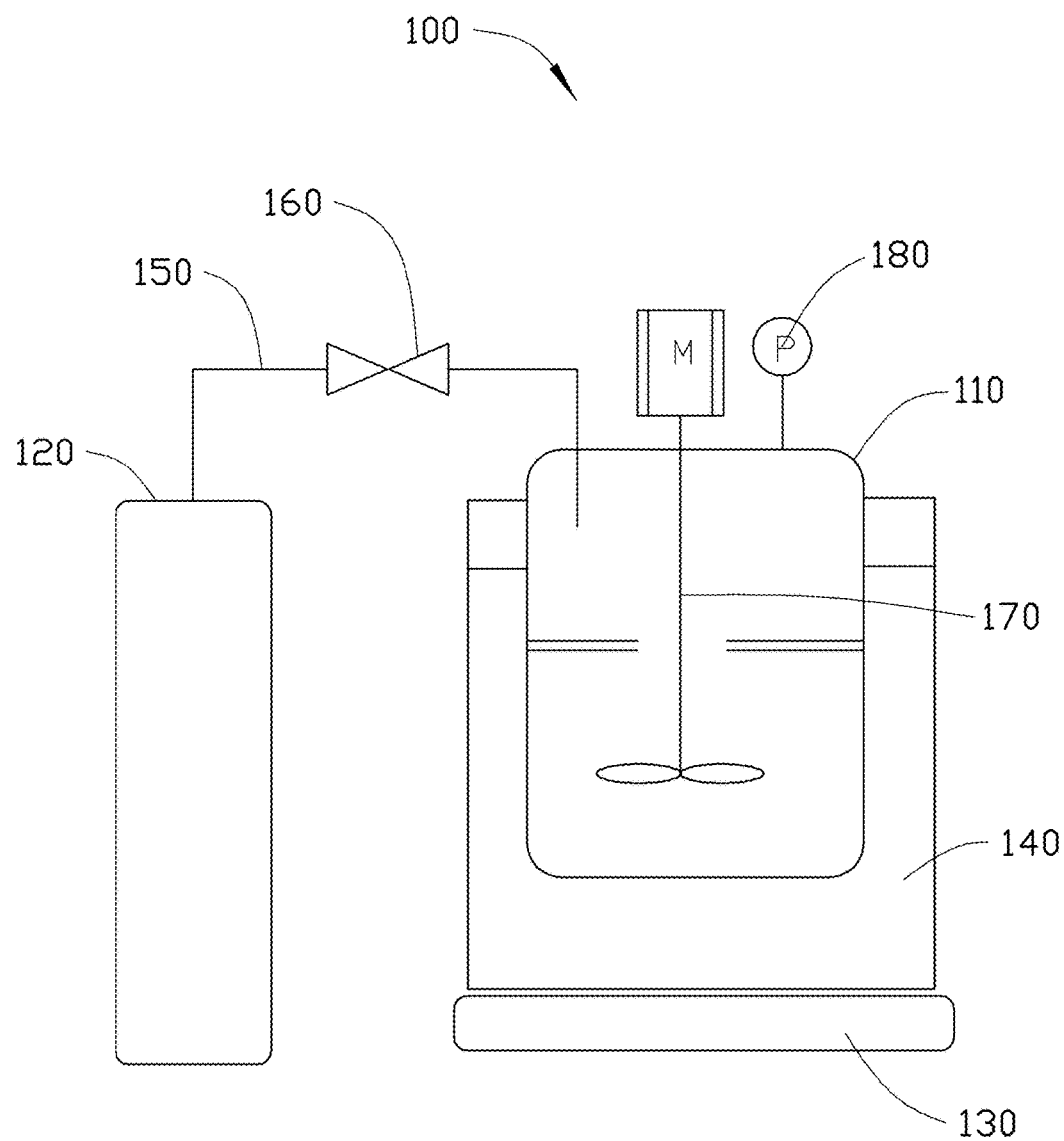
FIG. 1 is a schematic view of one embodiment of an apparatus used in a method for making lithium iron phosphate.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

One embodiment of a method for making lithium iron phosphate includes the following steps:

Step S1: mixing a lithium chemical compound, a ferrous chemical compound, and a phosphate-radical chemical compound together with an organic solvent to form a mixture. The organic solvent can be a diol and/or a polyol solvent.

Step S2: carrying out a solvothermal reaction of the mixture in a solvothermal reactor at a predetermined temperature.

Step S3: introducing a protective gas into the solvothermal reactor during the solvothermal reaction process to increase a pressure in the solvothermal reactor higher than a self-generated pressure of the solvothermal reaction.

The present method is based on the solvothermal method for making lithium iron phosphate. In the present method, an additional gas, (i.e., the protective gas), is introduced into the solvothermal reactor during the solvothermal reaction to increase the pressure in the solvothermal reactor at a lower temperature. Thus, the lithium iron phosphate is formed by a solvothermal reaction at a higher pressure and a lower temperature.

In step S1, before mixing, the lithium chemical compound, the ferrous chemical compound (i.e., the Fe element is divalent), and the phosphate-radical chemical compound are individually dissolved in the organic solvent to form three separate liquid solutions. Then, the three liquid solutions are mixed together to form the mixture.

In one embodiment, a concentration of $Fe^{2+}$ ions in the liquid solution of the ferrous chemical compound is about 0.1 mols per liter (mol/L) to about 0.4 mol/L. A concentration of phosphate ions in the liquid solution of the phosphate-radical chemical compound is about 0.1 mol/L to about 0.4 mol/L. A concentration of lithium ions in the liquid solution of the lithium chemical compound is about 0.4 mol/L to about 2 mol/L.

The lithium chemical compound can be selected from, but is not limited to being, lithium hydroxide (LiOH), lithium chloride (LiCl), lithium sulfate ($Li_2SO_4$), lithium nitrate ($LiNO_3$), lithium dihydrogen phosphate ($LiH_2PO_4$), lithium acetate ($CH_3COOLi$), and any combination thereof. The ferrous chemical compound can be selected from, but is not limited to being, ferrous sulfate ($FeSO_4$), ferrous acetate ($Fe(CH_3COO)_2$), ferrous chloride ($FeCl_2$), and any combination thereof. The phosphate-radical chemical compound can be selected from, but is not limited to being, phosphoric acid ($H_3PO_4$), lithium dihydrogen phosphate ($LiH_2PO_4$), triammonium phosphate ($(NH_4)_3PO_4$), monoammonium phosphate ($NH_4H_2PO_4$), diammonium phosphate (($NH_4$)$_2HPO_4$), and any combination thereof.

The organic solvent is a diol and/or polyol solvent, which can be selected from, but is not limited to being, ethylene glycol, glycerol, diethylene glycol, triethylene glycol, tetraethylene glycol, 1,2,4-butanetriol ($C_4H_{10}O_3$), erythritol ($C_4H_{10}O_4$), and any combination thereof. The organic solvent can be selected according to the selected lithium chemical compound, the selected ferrous chemical compound, and the selected phosphate-radical chemical compound. The organic solvent has a relatively high viscosity, and thus helps the lithium iron phosphate crystals to crystallize in a specific crystalline structure.

In one embodiment, the mixture does not contain any water. In another embodiment, the mixture contains a small amount of water. In some embodiments, the selected lithium chemical compound is a lithium hydrate, such as $LiOH \cdot H_2O$ or $C_2H_3LiO_2 \cdot 2H_2O$, and the selected ferrous chemical compound is an iron hydrate, such as $FeSO_4 \cdot 7H_2O$. When dissolving the lithium chemical compound and the ferrous chemical compound in the organic solvent, the water in the lithium hydrate and/or the water in the iron hydrate is introduced into the mixture. However, a volume ratio of aqueous to organic solvent is less than or equal to 1:10, to avoid affecting the crystallization of the lithium iron phosphate. In one embodiment, the volume ratio is smaller than 1:50.

In the mixture, a molar ratio of Li:Fe:P is about (2-3):1:(0.8-1.5). That is, in the mixture, Fe element is in 1 part, Li element is in 2-3 parts, and P element is in 0.8-1.5 parts. In one embodiment, the molar ratio of Li:Fe:P in the mixture is about 2.7:1:1.5.

An order of mixing the lithium chemical compound, the ferrous chemical compound, and the phosphate-radical chemical compound in the organic solvent is not limited.

In one embodiment, step S1 includes the following sub-steps:

S11: previously mixing the solution of the phosphate-radical chemical compound with the solution of the ferrous chemical compound to form a colorless solution.

S12: adding the liquid solution of the lithium chemical compound to the colorless solution to form the mixture.

In step S11, the liquid solution of the phosphate-radical chemical compound can be added to the liquid solution of the ferrous chemical compound drop-by-drop while stirring. An original color of the liquid solution of the ferrous chemical compound is yellow-green. The ferrous chemical compound has a chemical reaction with the phosphate-radical chemical compound. Adding the liquid solution of the phosphate-radical chemical compound results in a colorless solution.

In step S12, the liquid solution of the lithium chemical compound can be added to the colorless solution drop-by-drop while stirring to form the mixture, which has another chemical reaction, resulting in a blue-black viscous precipitate precipitating from the organic solvent.

In step S2, the mixture is sealed in the solvothermal reactor and heated to a predetermined temperature. In step S3, the pressure in the solvothermal reactor is increased by adding the protective gas into the solvothermal reactor, thus larger than the self generated pressure at the same conditions of the inner volume, the filling percentage, and the temperature of the solvothermal reactor.

In a conventional solvothermal reaction, the solvothermal reactor is a fully sealed autoclave. By heating the solvothermal reactor, the organic solvent is gasified and the gas pressure in the solvothermal reactor is larger than outside (i.e., larger than one atmosphere). The largest gas pressure during the solvothermal reaction generated solely by the gasification of the liquid in the solvothermal reactor is called self generated pressure. However, the self generated pressure is proportional to the temperature. That is, to increase the self generated pressure, the heating temperature of the solvothermal reactor must be increased. To form the lithium iron phosphate at a lower temperature and a higher pressure by using the solvothermal reaction, the present method additionally introduce the protective gas into the solvothermal reaction to achieve a higher pressure than the self generated pressure at the same temperature.

Referring to FIG. 1, the solvothermal reaction can be carried out in an apparatus 100, which includes a solvothermal reactor 110, a heating device, and a protective gas-introducing device 120. The apparatus 100 as a whole is a sealed system, so that only the protective gas, and not atmospheric gas, is introduced into the solvothermal reactor 110 during the solvothermal reaction.

The protective gas-introducing device 120 is connected to the solvothermal reactor 110 through a pipe 150 and introduces the protective gas into the solvothermal reactor 110. The gas pressure in the protective gas-introducing device 120 can be greater than the gas pressure in the solvothermal reactor 110. The protective gas can be at least one of inert gas and nitrogen gas, such as argon gas. The protective gas-introducing device 120 can include a valve 160 to control a flow of the protective gas. The protective gas-introducing device 120 can be a high pressure gas cylinder, such as a liquid nitrogen cylinder.

The heating device is located outside the solvothermal reactor 110, to heat the solvothermal reactor 110 to a predetermined temperature. The heating device can include a heater 130 and an oil bath 140. The heater 130 heats the oil bath 140. The solvothermal reactor 110 is placed in the oil bath 140 to be uniformly heated by the oil bath 140.

The apparatus 100 can further include a stirring device 170 located in the solvothermal reactor 110 to stir the mixture during the solvothermal reaction.

The apparatus 100 can further include a pressure meter 180 to measure the pressure in the solvothermal reactor 110.

In step S2, the mixture is heated in the solvothermal reactor 110, the organic solvent is gasified, and the pressure in the solvothermal reactor 110 is increased. In step S3, after the pressure in the solvothermal reactor 110 stops increasing and is stable at the largest pressure it can reach (i.e., reaches to the self generated pressure), the valve 160 of the protective gas-introducing device 120 can be opened, and the protective gas flows into the solvothermal reactor 110 to increase the pressure in the solvothermal reactor 110 to a predetermined pressure. The valve 160 is closed when the pressure in the solvothermal reactor 110 reaches the predetermined pressure, to stop the introducing of the protective gas. Step S3 is carried out during the step S2, thus, during the introducing of the protective gas, the solvothermal reactor 110 is still heated at the predetermined temperature. After the pressure in the solvothermal reactor 110 increases to the predetermined pressure, the predetermined pressure and the predetermined temperature of the solvothermal reactor 110 are maintained until the solvothermal reaction step completes.

The predetermined temperature can be in a range from about 160 degrees Celsius (° C.) to about 180° C. After introducing the protective gas, the predetermined pressure in the solvothermal reactor 110 can be larger than 0.2 megapascals (MPa) and smaller than or equal to 0.7 MPa.

A time period for the solvothermal reaction can be in a range from about 1 hour to about 24 hours. After the solvothermal reaction step completes, the solvothermal reactor 110 can be naturally cooled to room temperature. The product in the solvothermal reactor 110 is lithium iron phosphate.

During the mixing in step S1, an additional chemical compound containing a doping element can be mixed with the lithium chemical compound solution, the ferrous chemical compound solution, and the phosphate-radical chemical compound solution in a predetermined ratio to achieve a doped lithium iron phosphate. The doping element can be selected from, but not limited to, alkali metal elements, alkaline-earth metal elements, Group-13 elements, Group-14 elements, transition metal elements, rare-earth elements, and any combination thereof. In one embodiment, the doping element can be at least one of copper (Cu), manganese (Mn), nickel (Ni), chromium (Cr), cobalt (Co), vanadium (V), titanium (Ti), aluminum (Al), zinc (Zn), gallium (Ga), neodymium (Nd), and magnesium (Mg).

After the product is cooled to room temperature, the product is washed and dried. The product is washed, filtered, and centrifuged by deionized water several times. Then, the product is dried by suction filtration or heating.

The product can be sintered in a protective gas at a sintering temperature. The sintering temperature can be in a range from about 400° C. to about 800° C. A sintering time can be in a range from about 2 hours to about 12 hours. The protective gas can contain inert gas, nitrogen gas ($N_2$), hydrogen gas ($H_2$), or any combination thereof. In one embodiment, the product is sintered in a gas composed of about 5% of $H_2$ and about 95% of $N_2$. The sintering step helps the lithium iron phosphate to crystallize, which improves the performance of the lithium-ion battery.

Furthermore, the lithium iron phosphate can be coated by carbon. The carbon-coating process can include the following steps:

preparing a liquid solution of a carbon-source chemical compound;

adding the lithium iron phosphate into the liquid solution of the carbon-source chemical compound to form a solid-liquid mixture; and heating the solid-liquid mixture.

The carbon source chemical compound can be a reductive organic chemical compound. The reductive organic chemical compound can be pyrolyzed in an oxygen free condition to form simple carbon (e.g., amorphous carbon). The pyrolysis step does not generate any other solid phase substance. The carbon source chemical compound can be selected from, but not limited to, saccharose, dextrose, SPAN 80, epoxide resin, phenolic resin, furan resin, polyacrylic acid polyacrylonitrile, polyethylene glycol, polyvinyl alcohol, or any combination thereof. In one embodiment, the carbon-source chemical compound is saccharose. The carbon-source chemical compound is dissolved in a solvent such as organic solvent and/or deionized water to form the liquid solution having a concentration in a range from about 0.005 grams per milliliter (g/ml) to about 0.05 g/ml. The concentration of the carbon-source chemical compound is such that the lithium iron phosphate becomes uniformly coated with carbon after heating. After adding the lithium iron phosphate into the liquid solution of the carbon-source chemical compound, the solution is dried and heated at about 300° C. to about 800° C. A heating time of the solid-liquid mixture can be in a range from about 0.5 hours to about 3 hours. The heating step can be carried out together with the sintering step as one step.

A composition of the lithium iron phosphate is represented by the chemical formula $Li_xFe_{1-y}M_yPO_4$, wherein $0.1 \leq x \leq 1.1$, and $0 \leq y \leq 0.9$. M represents at least one of the chemical elements of alkali metal elements, alkaline-earth metal elements, Group-13 elements, Group-14 elements, transition metal elements, and rare-earth elements. In one embodiment, M represents at least one of the chemical elements of Cu, Mn, Cr, Co, V, Ti, Al, Zn, Ni, Ga, and Mg.

One embodiment of a lithium ion battery includes a cathode electrode, an anode electrode, and a non-aqueous electrolyte disposed between the cathode electrode and the anode electrode. The cathode electrode includes a cathode current collector and a cathode material layer disposed on a surface of the cathode current collector. The anode electrode includes an anode current collector and an anode material layer disposed on a surface of the anode current collector.

In one embodiment, the cathode material layer includes a cathode active material, a conductive agent, and a binder uniformly mixed with each other. The cathode active material is the lithium iron phosphate. The anode material layer can include a plurality of anode active material particles, a conductive agent, and a binder uniformly mixed with each other.

The anode active material particles can be selected from, but not limited to, lithium titanate spinel oxide (e.g., $Li_4Ti_5O_{12}$), graphite, acetylene black, organic-cracked carbon, mesocarbon microbeads (MCMB), or any combination thereof. The conductive agent can be selected from, but not limited to, at least one of acetylene black, carbon fibers, carbon nanotubes, and graphite. The binder can be selected from, but not limited to, at least one of polyvinylidene fluoride (PVDF), polytetrafluoroethylene (PTFE), and styrene-butadiene rubber (SBR). The non-aqueous electrolyte can be a solid film or a solution made of a lithium salt dissolved in an organic solvent. The lithium salt can be selected from, but not limited to, at least one of lithium hexafluorophosphate ($LiPF_6$), LiBOB ($C_4BO_8Li$), lithium tetrafluoroborate ($LiBF_4$), lithium hexafluoroantimonate ($LiSbF_6$), lithium hexafluoroarsenate (V) ($LiAsF_6$), lithium perchlorate ($LiClO_4$), lithium triflate ($LiCF_3SO_3$), $Li(CF_3SO_2)_2N$, $LiC_4F_9SO_3$, $LiSbF_6$, $LiAlO_4$, lithium tetrachloroaluminate ($LiAlCl_4$), lithium chloride (LiCl), and lithium iodide (LiI). The organic solvent can be a cyclic carbonate and/or a linear carbonate, and can be at least one of ethylene carbonate (EC), propylene carbonate (PC), ethylmethyl carbonate (EMC), diethyl carbonate (DEC), and dimethyl carbonate (DMC). The lithium ion battery can further include a porous membrane or a separator located between the cathode electrode and the anode electrode. The separator can be made of polypropylene (PP) or polyethylene (PE). The lithium ion battery can further include an exterior encapsulating structure, such as a hard battery case or a soft encapsulating bag. The lithium ion battery can further include a connecting component to achieve an electrical connection between the current collector of the lithium ion battery and the external circuit.

EXAMPLE 1

In Example 1, the lithium chemical compound is $LiOH \cdot H_2O$, the ferrous chemical compound is $FeSO_4 \cdot 7H_2O$, the phosphate chemical compound is $H_3PO_4$, and the organic solvent is ethylene glycol. $LiOH \cdot H_2O$ is dissolved in the ethylene glycol to achieve a solution having a concentration of the $Li^+$ be about 1.53 mol/L. $FeSO_4 \cdot 7H_2O$ is dissolved in the ethylene glycol to achieve a solution having a concentration of the $Fe^{2+}$ be about 0.3 mol/L. The color of the $FeSO_4$ solution is yellow-green. About 2.832 ml of $H_3PO_4$ is added to about 93.2 ml of the $FeSO_4$ solution, and the solution is stirred until the yellow-green color of the $FeSO_4$ solution turns colorless. About 50.4 ml of the LiOH solution is added to the $H_3PO_4$ and $FeSO_4$ solution and stirred for about 30 minutes to achieve a blue-black viscous precipitate in the ethylene glycol. The blue-black viscous precipitate and the ethylene glycol are stirred for about 30 minutes and heated in the solvothermal reactor 110 at about 180° C. During the vaporization of the organic solvent, the pressure in the solvothermal reactor 110 increases. After the pressure in the solvothermal reactor 110 is stable, the valve 160 is opened to allow nitrogen gas to flow into the solvothermal reactor 110 until the pressure in the solvothermal reactor 110 reaches about 0.7 MPa. The solvothermal reaction is carried out for about 14 hours. Then, the solvothermal reactor 110 is naturally cooled to room temperature. The product in the solvothermal reactor 110 is first washed with deionized water, then washed with ethanol, and then dried.

Figure 2:
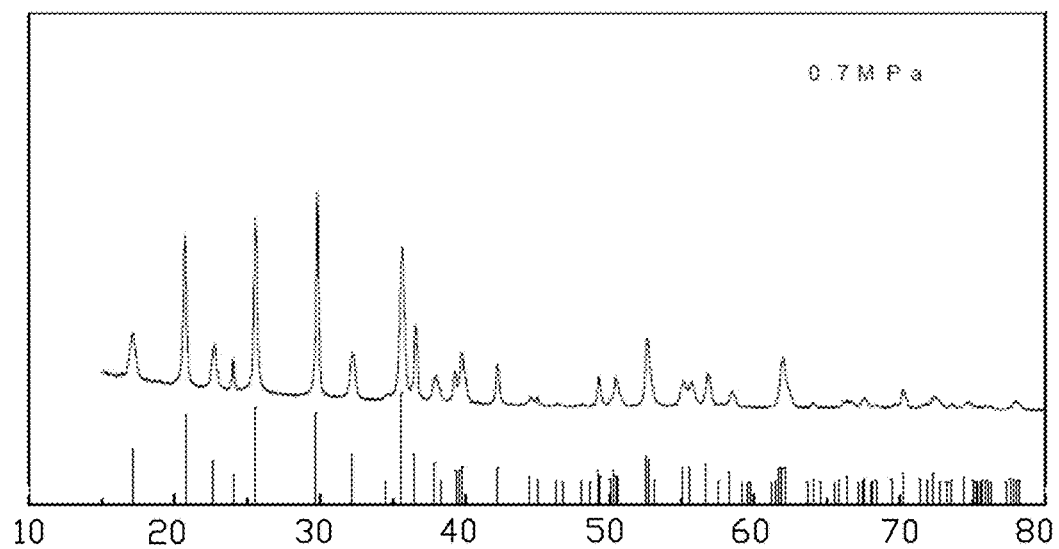
FIG. 2 shows an X-ray diffraction (XRD) pattern of the lithium iron phosphate made by one embodiment of the present method.
Figure 3:
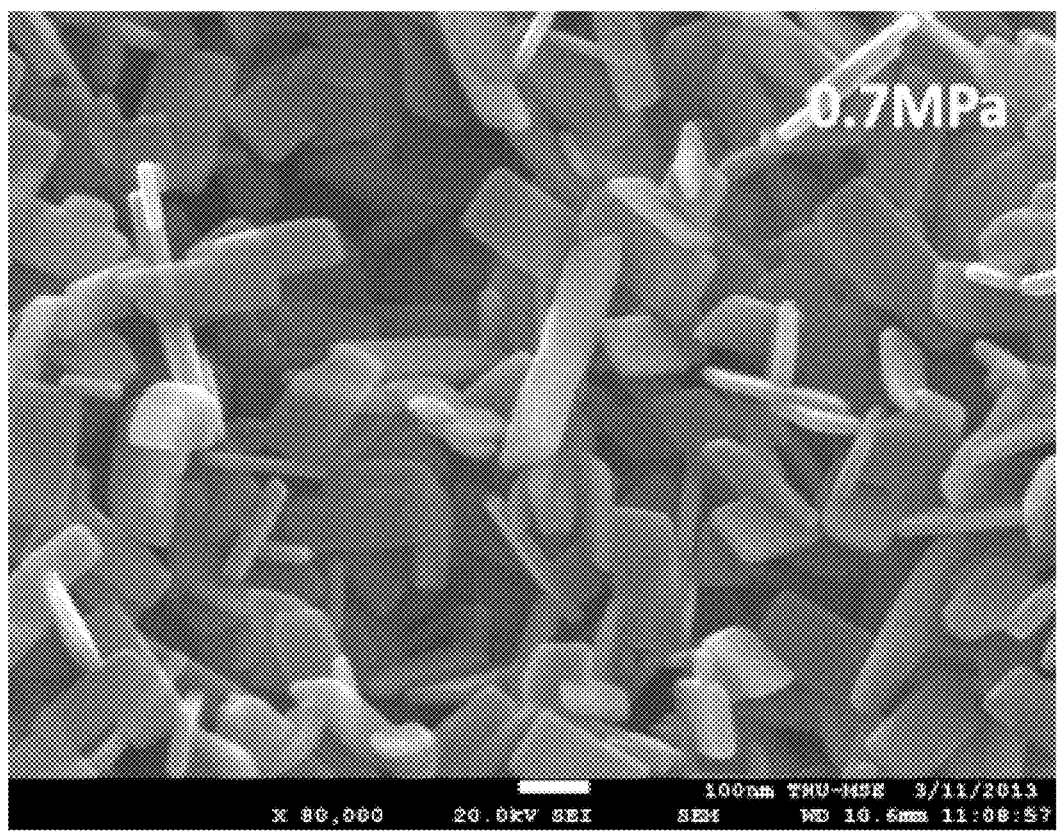
FIG. 3 shows a Scanning Electron Microscope (SEM) image of the lithium iron phosphate made by one embodiment of the present method.

Referring to FIG. 2, the XRD pattern of the product matches a standard XRD pattern of $LiFePO_4$, which proves that the product is $LiFePO_4$. The characteristic peaks of the $LiFePO_4$ in the XRD pattern are relatively strong, which proves that the synthesized $LiFePO_4$ is well-crystallized. Referring to FIG. 3, the synthesized $LiFePO_4$ has a nano-sized thickness.

EXAMPLE 2

The method in Example 2 is substantially the same as the method in Example 1, except that the nitrogen gas is introduced to the solvothermal reactor until the pressure in the solvothermal reactor reaches about 0.3 MPa.

EXAMPLE 3

The method in Example 3 is substantially the same as the method in Example 1, except that the nitrogen gas is introduced to the solvothermal reactor until the pressure in the solvothermal reactor reaches about 0.4 MPa.

EXAMPLE 4

The method in Example 4 is substantially the same as the method in Example 1, except that the nitrogen gas is introduced to the solvothermal reactor until the pressure in the solvothermal reactor reaches about 0.5 MPa.

EXAMPLE 5

The method in Example 5 is substantially the same as the method in Example 1, except that the nitrogen gas is introduced to the solvothermal reactor until the pressure in the solvothermal reactor reaches about 0.6 MPa.

COMPARATIVE EXAMPLE 1

The method in the Comparative Example 1 is substantially the same as the method in Example 1, except that no protective gas is introduced into the solvothermal reactor, the solvothermal reacting is carried out only under the self generated pressure. The solvothermal reactor is completely sealed after the blue-black viscous precipitate in the ethylene glycol is disposed therein and heated to about 180° C. The pressure in the solvothermal reactor reaches a stable 0.2 MPa. The solvothermal reaction is carried out for about 14 hours without introducing any additional gas into the solvothermal reactor.

Figure 4:
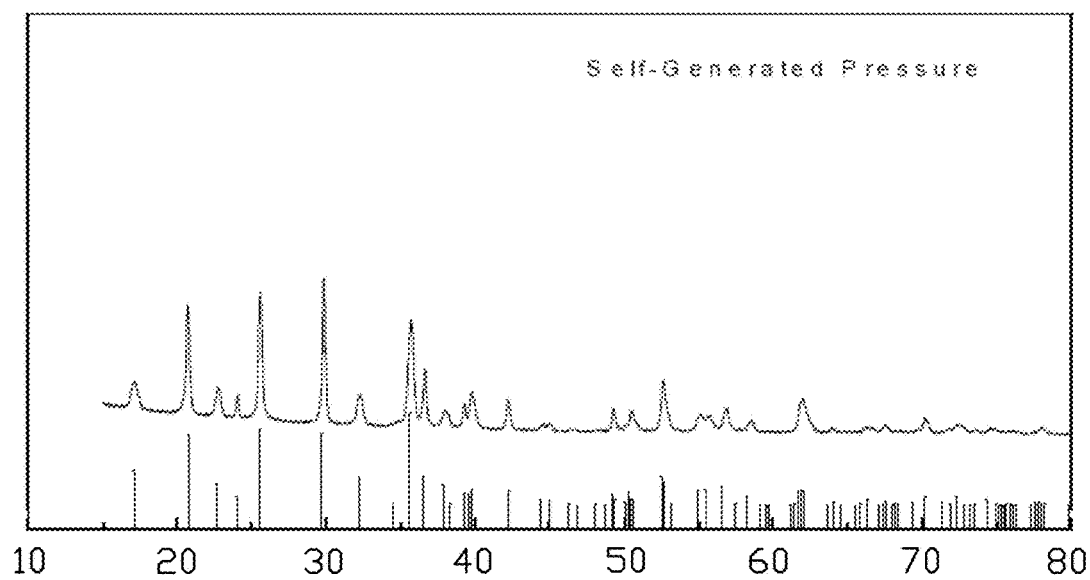
FIG. 4 shows an XRD pattern of the lithium iron phosphate of a Comparative Example.

Referring to FIG. 4, the XRD pattern of the product in the Comparative Example 1 matches a standard XRD pattern of $LiFePO_4$, which proves that the product is $LiFePO_4$. However, the characteristic peaks of the $LiFePO_4$ in the XRD pattern are relatively weak, which shows that the synthesized $LiFePO_4$ in the Comparative Example 1 has low crystallinity.

TABLE 1

| | a/Å | b/Å | c/Å | V | Occ_$Fe^{2+}$ | ± | Fe/Li % |
|---|---|---|---|---|---|---|---|
| Comparative Example 1 | 10.2926 0.0009 | 5.9804 0.0005 | 4.6992 0.0004 | 289.2536162 | 0.012468898 | 0.002 | 2.49 |
| Example 1 | 10.2993 | 5.9843 | 4.6967 | 289.4786125 | 0.011114882 | 0.002 | 2.22 |
| Standard value | 10.332 | 6.01 | 4.692 | 291.3512414 | | | |

Table 1 shows results of curve-fitting the XRD tests of Example 1 and the Comparative Example 1. It can be concluded from Table 1 that the Li atoms and Fe atoms in the $LiFePO_4$ of Example 1 are less disordered than the Li and Fe atoms of the Comparative Example, and a size of a unit cell of $LiFePO_4$ of Example 1 is larger than that of the Comparative Example 1. The lower level of disorder and the larger size of the unit cell improve the electrochemical properties of the material.

The $LiFePO_4$ of Example 1 and Comparative Example 1 are coated with carbon by mixing the $LiFePO_4$ powder and the sucrose in water and heating the mixture at about 600° C. for about 5 hours. The carbon in the carbon coated $LiFePO_4$ has a mass percentage of about 5%. The lithium ion batteries using the carbon-coated $LiFePO_4$ of Example 1 and Comparative Example 1 are assembled. The carbon coated $LiFePO_4$ is used as the cathode active material, and the lithium metal is used as the anode electrode.

Figure 5:
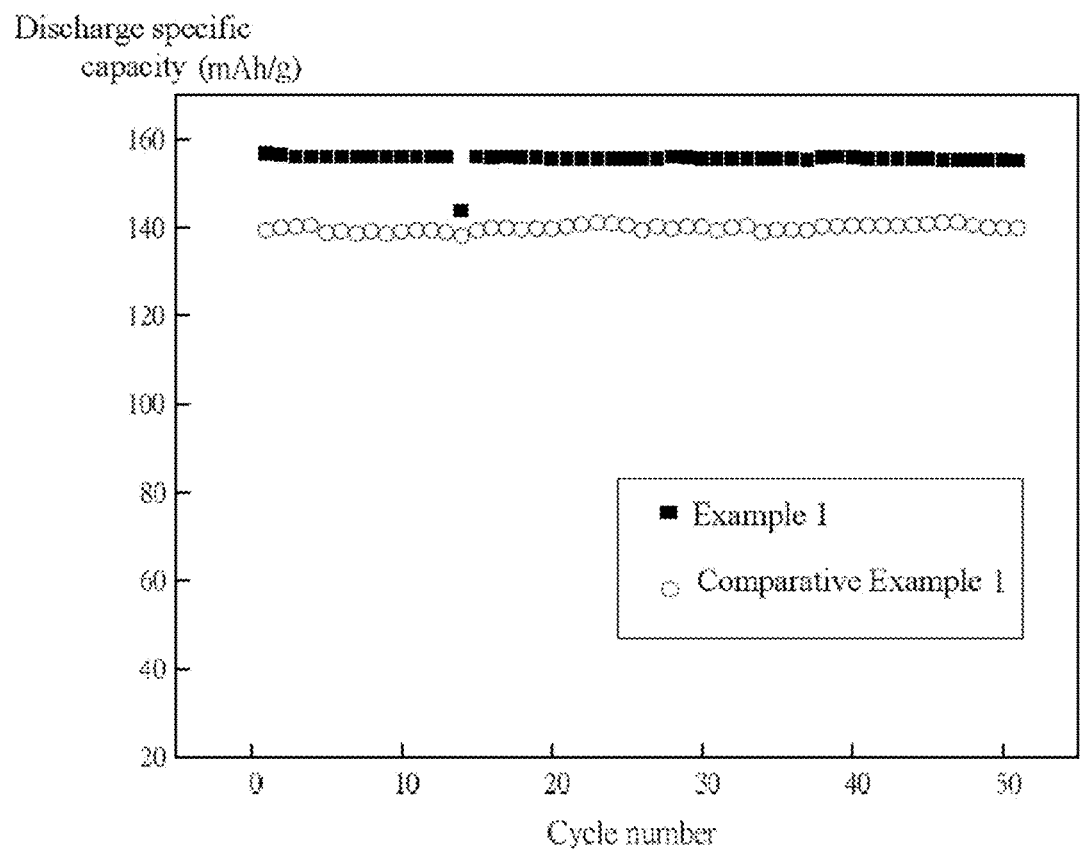
FIG. 5 shows discharge curves of lithium ion batteries using the lithium iron phosphates made by the present method and a Comparative Example.

The electrolyte solution is $LiPF_6$/EC+DMC (1:1, v/v). Referring to FIG. 5, a discharge specific capacity of a first cycle of the lithium ion battery of Example 1 is about 160 milliampere hours per gram (mAh/g). After 50 cycles, the discharge specific capacity does not show any signs of decreasing. The discharge specific capacity of the lithium ion battery of Example 1 is higher than the discharge specific capacity of the lithium ion battery of Comparative Example 1.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is to be understood that the above-described embodiments are intended to illustrate rather than to limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making lithium iron phosphate comprising:
    mixing a lithium chemical compound, a ferrous chemical compound, a phosphate-radical chemical compound and an organic solvent to form a mixture; and the organic solvent is at least one of diols and polyols;
    carrying out a solvothermal reaction of the mixture in a solvothermal reactor by sealing the mixture in the solvothermal reactor and heating the mixture sealed in the solvothermal reactor to a predetermined temperature so that a pressure in the solvothermal reactor is increased to be stable at a self generated pressure at conditions of inner volume, filling percentage, and the predetermined temperature of the solvothermal reactor;
    introducing a protective gas into the solvothermal reactor during the solvothermal reaction and after the pressure in the solvothermal reactor is stable at the self generated pressure to increase the pressure in the solvothermal reactor to be a predetermined pressure higher than the self generated pressure in the solvothermal reactor at the same conditions of inner volume, filling percentage, and the predetermined temperature of the solvothermal reactor; and
    forming a first plurality of $LiFePO_4$ particles by keeping the predetermined pressure for a period in a range from about 1 hour to about 24 hours, wherein Li atoms and Fe atoms in the first plurality of $LiFePO_4$ particles formed under the predetermined pressure are less disordered than Li atoms and Fe atoms of a second plurality of $LiFePO_4$ particles formed under the self generated pressure, and a first size of a first unit cell of the first plurality of $LiFePO_4$ particles formed under the predetermined pressure is larger than a second size of a second unit cell of the second plurality of $LiFePO_4$ particles formed under the self generated pressure.

2. The method of claim 1, wherein the organic solvent is selected from the group consisting of ethylene glycol, glycerol, diethylene glycol, triethylene glycol, tetraethylene glycol, 1,2,4-butanetriol, erythritol, and combinations thereof.

3. The method of claim 1, wherein the mixing comprises:
    previously mixing the ferrous chemical compound and the phosphate-radical chemical compound to form a solution; and
    adding the lithium chemical compound to the solution to form the mixture.

4. The method of claim 1, wherein the solvothermal reaction is carried out in the solvothermal reactor of an apparatus, the apparatus further comprises a protective gas-introducing device, and the protective gas-introducing device introduces the protective gas into the solvothermal reactor.

5. The method of claim 4, wherein a pressure in the protective gas-introducing device is larger than the pressure in the solvothermal reactor.

6. The method of claim 4, wherein the introducing comprises:
    opening a valve of the protective gas-introducing device to introduce the protective gas into the solvothermal reactor to increase the pressure in the solvothermal reactor to a predetermined pressure; and
    closing the valve to stop the introducing of the protective gas.

7. The method of claim 1, wherein the pressure in the solvothermal reactor is larger than 0.2 MPa and smaller than or equal to 0.7 MPa, and the predetermined temperature in the solvothermal reactor is in a range from about 160° C. to about 180° C.

8. The method of claim 1, wherein the protective gas is at least one of inert gas and nitrogen gas.

9. The method of claim 1, wherein a volume ratio of water to the organic solvent in the mixture is smaller than or equal to 1:10.

10. The method of claim 1, wherein the lithium chemical compound is selected from the group consisting of lithium hydroxide, lithium chloride, lithium sulfate, lithium nitrate, lithium dihydrogen phosphate, lithium acetate, and combinations thereof.

11. The method of claim 1, wherein the ferrous chemical compound is selected from the group consisting of ferrous sulfate, ferrous acetate, ferrous chloride, and combinations thereof.

12. The method of claim 1, wherein the phosphate-radical chemical compound is selected from the group consisting of phosphoric acid, lithium dihydrogen phosphate, triammonium phosphate, monoammonium phosphate, diammonium phosphate, and combinations thereof.

13. The method of claim 1, wherein in the mixture, the phosphate-radical chemical compound, the ferrous chemical compound, and the lithium chemical compound are mixed in a molar ratio of $Li:Fe:P=(2\sim3):1:(0.8\sim1.5)$.

14. The method of claim 1, wherein the mixing comprises:
    the lithium chemical compound, the ferrous chemical compound, and the phosphate-radical chemical compound are individually dissolved in the organic solvent to form liquid solutions; and
    mixing the liquid solutions to form the mixture.

15. The method of claim 4, wherein the apparatus is a sealed system.

16. The method of claim 1, further comprising carbon coating the first plurality of $LiFePO_4$ particles to form a plurality of carbon coated $LiFePO_4$ particles.

17. The method of claim 16, wherein a discharge specific capacity of a first cycle of a lithium ion battery using the plurality of carbon coated $LiFePO_4$ particles as a cathode active material is about 160 milliampere hours per gram.

* * * * *